United States Patent Office 3,431,646
Patented Mar. 11, 1969

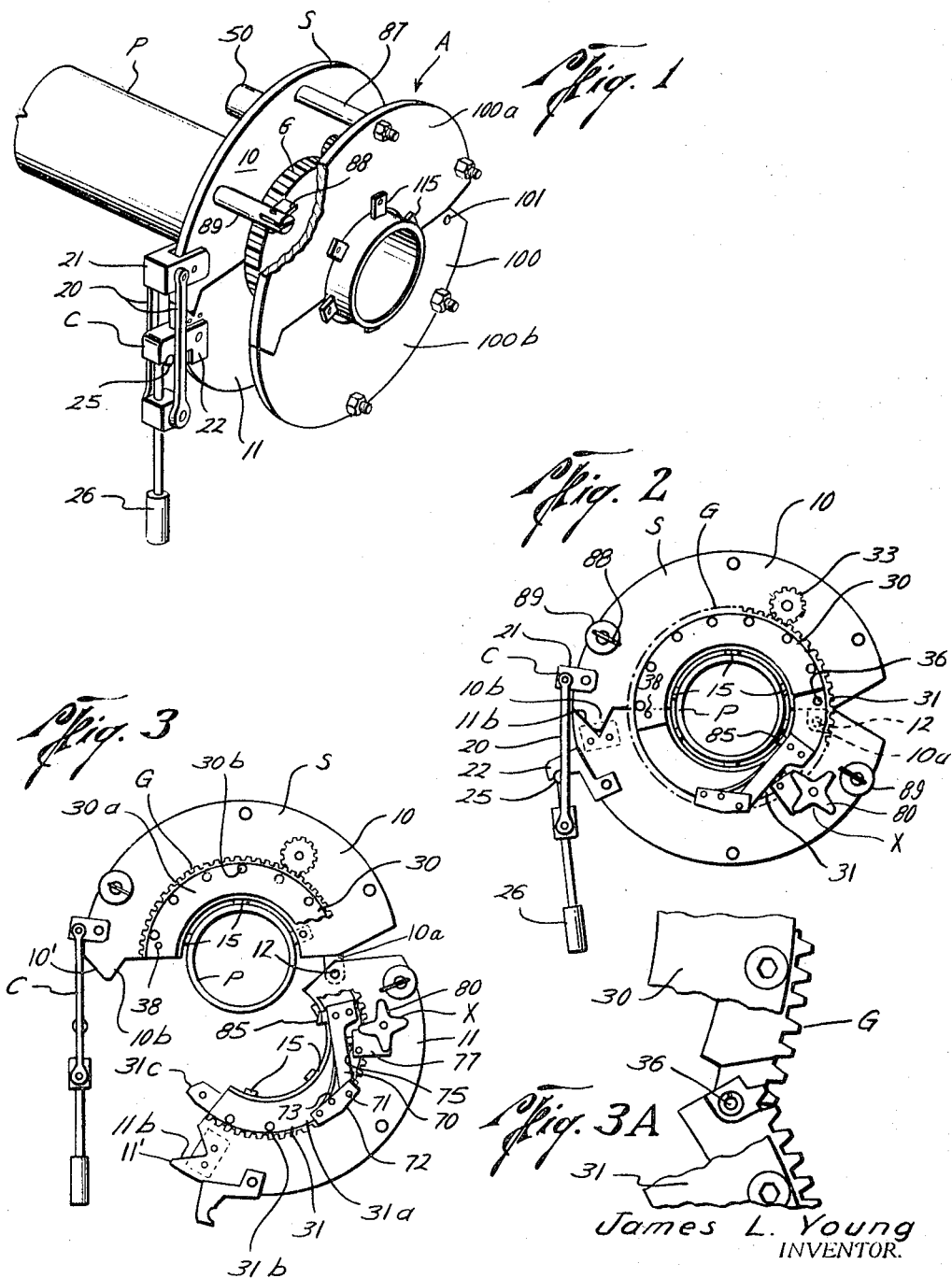

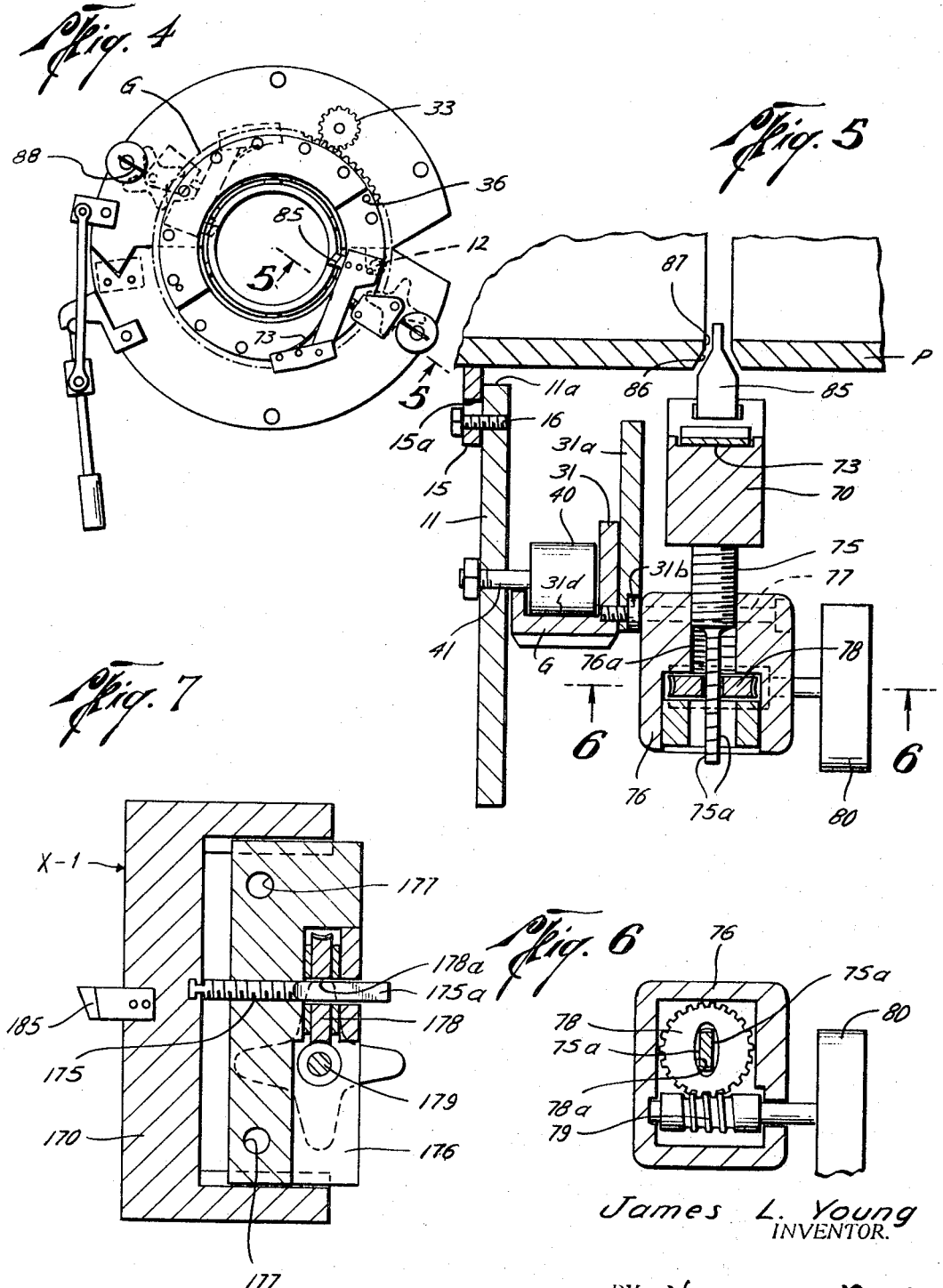

3,431,646
PIPE CUTTING AND BEVELING APPARATUS
James L. Young, P.O. Box 35137,
Houston, Tex. 77035
Filed Mar. 24, 1967, Ser. No. 625,763
U.S. Cl. 30—97
Int. Cl. B23d *21/10;* B26d *3/16*
7 Claims

ABSTRACT OF THE DISCLOSURE

A pipe cutting and beveling apparatus having a rotatable cutter head for supporting a cutting element therewith during rotation for cutting an annular groove in a pipe and to form same with a bevel for subsequent welding; such cutter head being adapted to be opened for release from the pipe and for mounting at any part of the pipe.

Background of the invention

The field of this invention is apparatus for cutting and/or beveling pipe. Prior apparatus of this general type is shown in U.S. Patent No. 2,769,234.

Summary of the invention

The present invention is an improvement on the apparatus disclosed in said Patent No. 2,769,234 in that the apparatus provides for stabilizing of the pipe on each side of the cut made in the pipe by the apparatus so that an accurate cut and bevel is obtained. Additionally, the present apparatus may be quickly and easily opened for insertion on and removal from any part of a pipe to be beveled, whereby a pipeline may be cut and beveled while still in place in a ditch or other location so long as it is accessible for positioning the apparatus thereon.

An object of the invention therefore is to provide a new and improved pipe cutting and beveling apparatus.

Other objects and advantages will become evident from the following description and the drawings.

Brief description of the drawings

FIG. 1 is an isometric view illustrating the preferred embodiment of the present invention disposed on a pipe which is to be cut and beveled;

FIG. 2 is an end view of a portion of the apparatus of FIG. 1, with the parts in a closed position on a pipe;

FIG. 3 is a view similar to FIG. 2, but illustrating the apparatus in an open position with respect to the pipe;

FIG. 3A is a fragmentary enlarged view illustrating the hinged connection of the gear sections;

FIG. 4 is a view similar to FIG. 2, but illustrating in dotted lines the cutter assembly in a second position as it rotates relative to the pipe being cut and beveled;

FIG. 5 is a view taken at 90 degrees to the line 5—5 of FIG. 4 to illustrate details of the present invention;

FIG. 6 is a sectional view taken on lines 6—6 of FIG. 5 to illustrate further the cutter assembly of the present invention; and FIG. 7 is a sectional view illustrating a modified form of the cutter assembly.

Description of the preferred embodiments

In the drawings, the letter A designates generally the apparatus of the present invention which is particularly suitable for cutting and beveling a pipe P to prepare the end surface thereof for subsequent welding. Briefly, the apparatus A is constructed so that it may be disposed on the pipe P by opening same and moving it laterally onto the side of the pipe P, whereby the apparatus A may be mounted on the pipe P even though the pipe P is a portion of a long pipe line, is buried or is otherwise fixed so that the end thereof is not available for the insertion of the apparatus A.

Considering the invention more in detail, the apparatus A includes a support ring S which is preferably formed in two arcuate sections 10 and 11. The two sections 10 and 11 form a complete ring with a central opening defined by the interior curved surfaces of such sections 10 and 11, a portion of which is indicated at 11a (FIG. 5). The sections 10 and 11 are hinged together by a hinge bolt or pin 12 having a nut or other retaining element (not shown) with the pin 12. Such pin 12 extends through section 11 and a tab 10a formed as part of the section 10 so that such sections 10 and 11 may pivot with respect to each other from the closed position of FIG. 2 to the open position of FIG. 3, and vice versa. The opposite ends 10' and 11' of the sections 10 and 11 are preferably formed with a mating recess 11b and a projection 10b so that relative movement therebetween in the closed position of FIG. 2 is prevented. The inner bore of the complete support ring S formed by the sections 10 and 11 closely conforms with the outer diameter or surface of the pipe P and may actually engage such surface. To provide for greater adjustability, a plurality of adjustable fingers 15, one of which is illustrated in detail in FIG. 5, may be secured to each of the sections 10 and 11. Such fingers 15 have an elongated slot 15a through which extends a retaining screw 16 so that the support rings 10 and 11 may be positioned on pipes P having various diameters within the limits provided by the movement of the fingers 15. Such fingers 15 are disposed at intervals substantially as shown in FIG. 3.

To hold the support ring S securely positioned on the pipe P, the ends 10' and 11' are clamped together by any suitable clamp such as indicated by the letter C in the drawings. Such clamp C is an over-center type which has a pair of pivoted links 20 which are pivotally secured to a retaining block 21 that is fastened to the plate 10. A catch lock 22 is fastened to the section 11 of the support ring S and it is adapted to receive a locking pin 25 on the end of a pivoted handle 26. In the clamped position, the pivot links 20 go past the pivot pin 25 thereby locking the clamp C so as to prevent it from being opened until the handle 26 is pulled so as to move the links 20 on the other side of the locking element 25. It will be appreciated that other types of clamping devices may be employed so long as the support ring S becomes a unitary structure rigidly secured to the pipe P in the closed position of FIGS. 1 and 2, and so long as the sections 10 and 11 of the support ring S may be separated easily to the open position of FIG. 3 for the lateral removal of the apparatus A from the pipe P.

The apparatus A includes a gear ring G which is made from two or more arcuate gear sections 30 and 31. Such gears sections 30 and 31, when in the closed position of FIGS. 1 and 2 form a complete gear ring with external gear teeth which are adapted to engage a drive gear 33, the purpose of which will be hereinafter explained.

To stabilize the gear sections 30 and 31, and to also provide a means of connecting same together and for opening same when desired, each gear section has a stiffening plate therewith indicated at 30a and 31a. The plates 30a and 31a are bolted or are otherwise secured to the gear sections 30 and 31, respectively, by screws or bolts 30b and 31b, respectively.

The plates 30a and 31a are hinged together at a hinge 36 to form a stiffening ring and are releasably secured together by a releasable screw or connector 38 at the other end which passes through the plate 30a and through an extension 31c of the plate 31a. Thus, in the closed position of FIG. 2, the gear ring G is a complete circular gear with the plates 30a and 31a also forming a complete circle. The bore of the ring formed by the plates 30a and 31a is substantially the same as the diameter of the pipe P, but it should not touch the pipe P since the gear ring G and the plates 30a and 31a rotate relative to such pipe P, as will be explained.

The gear sections 30 and 31 are formed with an internal track indicated at the 31d for the section 31 in FIG. 5. Such track 31d is adapted to receive guide rollers 40 which are rotatably mounted upon spindles 41 secured to the support ring S. A sufficient number of such rollers 40, preferably six, are provided in a circular spacing an equal distance from the center of the pipe P to support the gear sections 30 and 31 for relative rotation with respect to the support ring S. To obtain such rotation of the gear ring G, the drive gear 33 is rotated by an air driven motor 50 or any other suitable source of power.

Either the gear ring G, or the plates 30a and 31a therewith, carry a cutter assembly X therewith during rotation of the gear ring G relative to the support ring S and the pipe P. Although the cutter assembly X may take numerous forms within the spirit of the present invention, a preferred form is illustrated in FIGS. 1–6. Thus, a pivoted cutter arm 70 is pivoted at 71 to a block 72 which is secured by bolts or other suitable means to the gear ring plate 31a. A resilient leaf spring 73 acts against the arm 70 to urge it away from the pipe P and into contact with a threaded advancing element 75. The threaded advancing element 75 is likewise carried by the gear ring plate 31a and moves with the entire cutter assembly X. The details of such construction in its preferred form are shown in FIG. 5. As can be seen therein, the advancing element 75 is a regular bolt which has external threads and which is threadedly engaged within a threaded opening 76a of a block 76, which block 76 is secured to the plate 31a by one or more bolts or screws 77. The lower portion of the advancing screw 75 is ground off or flattened on two sides as indicated at 75a (FIGS. 5 and 6) so that it extends freely through an elliptical opening 78a of a gear 78. The gear 78 meshes with a worm gear 79 which has a star wheel 80 formed therewith. As the star wheel 80 is rotated, it rotates the worm gear 79 which rotates the gear 78. Such rotation of the gear 78 is transmitted to the advancing screw 75 so that it is rotated and moved longitudinally to force the cutter bar 70 towards the pipe P. The bar 70 carries a conventional cutting tool 85 which is preferably shaped so as to cut a bevel 86 and a straight perpendicular surface 87 which is desirable for a welding groove.

The star wheel 80 is positioned so that it contacts actuating fingers or levers 88 disposed at any suitable intervals around the support ring S. Such levers or actuating tabs 88 are preferably mounted on tie rods 89, as will be more fully explained. In any event, each contact of the star wheel 80 with each of the tabs or levers 88 imparts a partial rotation to the star wheel 80, which rotation is transmitted ultimately to the advancing member 75 which moves the cutter tool 85 inwardly and increases the cut on the pipe P until the pipe P is cut entirely through the wall thereof as indicated in FIG. 5. Even after the wall of the pipe is completely cut through, it may be further beveled by continued rotation of the apparatus, as will be evident to those skilled in the art.

In the operation or use of the apparatus A of this invention, it may be placed on the pipe P from the side and clamped thereon with the releasable clamp C. Then, the motor 50 or other suitable source of power is operated to rotate the drive gear 33 to then rotate the gear ring G. The cutter assembly X moves with the gear ring G to cut the pipe P as the cutter tool 85 is advanced inwardly towards the pipe P.

To further stabilize the apparatus A, a stabilizing ring 100 is provided, which is preferably formed in two sections 100a and 100b, both of which are preferably pivoted together at the pivot pin 101 or any other suitable pivotal connection similar to that illustrated for ring S. In fact, the stabilizing plate 100 may be a duplicate of the support ring S if desired. It may also have adjustable fingers 115 which correspond with the fingers 15 previously described and positioned on the pipe P for adjusting same to pipes having different external diameters. The support plate S is connected to the stabilizing plate 100 by a plurality of tie rods 89 which extend through suitable bolt openings in the support ring S and the stabilizing ring or plate 100. Since the support ring 100 is adapted to open at substantially the same point as the support ring S, they both may be opened simultaneously as illustrated in FIG. 3 for releasing same from the pipe P. It should be noted that the stabilizing ring 100 is disposed on one side of the cut which is to be made with the cutting assembly X, while the supporting ring S is on the other side thereof. This maintains the alignment of the sections of pipe P as they are being cut and particularly during the final cutting action so that an out-of-round cut and beveling are avoided.

In disconnecting the apparatus A from its clamped position of FIG. 2, it should be noted that the gear ring G, with its plates 30 and 31, are initially rotated to align the hinge 36 at the same point as the hinge connection 12. This permits the support ring S to be opened at the same place as the gear ring G so that they may be removed simultaneously from the pipe P. The same situation is required for repositioning the apparatus A on the pipe from the side of the pipe P with a lateral movement relative to the longitudinally extending pipe P.

A modified cutter assembly X–1 is illustrated in FIG. 7, wherein the cutter element 185 is preferably the same as the cutter element 85 and is mounted on a movable support 170. A fixed block 176 is bolted or otherwise secured to the arcuate ring section 31a by means of bolts passing through the holes 177, or by any other suitable means. It is to be noted that the threaded element 175 which serves to advance the entire support 170 and the cutter tool 185 therewith is threaded through the block 176 and is provided with a flattened or elongated section 175a which is not threaded to gear 178, but instead passes freely through the bore 178a thereof in the same manner as described heretofore in connection with FIG. 6. A worm gear 179 is operated by means of a star wheel 80 or other device similar to that described heretofore in connection with FIGS. 5 and 6. Thus, upon rotation of the worm 179, the gear 178 is rotated to advance the threaded rod or advancing member 175, which thereby moves the movable support 170 and the cutting element 185 towards the pipe P for cutting and beveling same. Such assembly X–1 may therefore be substituted for the cutter assembly X, if desired.

The foregoing disclosure and description of the invention are illustrative and explanatory thereof and various changes in the size, shape and materials, as well as in the details of the illustrated construction, may be made within the scope of the appended claims without departing from the spirit of the invention.

I claim:
1. A pipe cutting and beveling apparatus, comprising:
   (a) a support ring formed in at least two arcuate separable sections and defining a central opening of substantially the same diameter as a pipe to be cut and beveled;
   (b) a hinge connecting said sections to enable same to be pivoted to an open position for laterally moving relative to the pipe for mounting same thereon and for thereafter moving to a closed position surrounding the pipe;
   (c) a releasable clamp for releasably securing said support ring sections together when they are in the closed position to thereby clamp the supporting ring securely to the pipe;
   (d) a split gear ring formed of at least two arcuate sec- tions and disposed adjacent to one side of said support ring; an annular set of gear teeth on said ring;
(e) a hinge connecting said gear ring sections for movement to and from an open position and a closed position simultaneously with said support ring sections;
(f) means for releasably securing said sections together in the closed position to form the complete ring;
(g) a plurality of rollers mounted on said support ring;
(h) said gear ring having an internal guide track engageable by said rollers and disposed radially outwardly with respect to said rollers for supporting said gear ring for rotation relative to said support ring;
(i) a drive gear mounted on said support ring and engageable with said gear ring for driving same;
(j) power means connected to said drive gear for supplying power to rotate said drive gear; and
(k) a cutter assembly connected to said gear ring for cutting contact with the pipe as said gear ring rotates.

2. The structure set forth in claim 1, including:
(a) a stabilizing ring formed in at least two arcuate sections corresponding in position to said arcuate sections of said support ring;
(b) said stabilizing ring being disposed longitudinally from said support ring, with said gear ring and cutter assembly between said stabilizing ring and said support ring;
(c) tie bolts disposed at a greater radius from the center of the pipe than the gear teeth of said gear ring; and
(d) said tie bolts extending from said support ring to said stabilizing ring and connecting same together to thereby secure said stabilizing ring to the pipe so that it remains stationary whereby both sides of the pipe on each side of the cut made by the cutter assembly are held axial alignment during the cutting of the pipe to assure an accurate cut and beveling.

3. The structure set forth in claim 1, including:
(a) a plurality of radially disposed pipe contacting fingers disposed so as to extend radially inwardly from the central opening of said support ring; and
(b) means for radially adjusting each of said fingers relative to said supporting ring to provide for seating said fingers on pipes of different diameters.

4. The structure set forth in claim 1, including:
(a) a stiffening ring formed in the same number of arcuate sections as said gear ring and secured thereto; and
(b) said stiffening ring having a central opening which is of substantially the same diameter as the diameter of the pipe upon which the apparatus is mounted.

5. The structure set forth in claim 1, wherein:
(a) said gear ring has a smaller external diameter than said support ring whereby said gear ring is protected by the support ring from contact with external objects during rotation of the gear ring and the parts rotatable therewith.

6. The structure set forth in claim 1, wherein:
(a) said gear ring has a smaller external diameter than said support ring whereby said gear ring is protected by the support ring from contact with external objects during rotation of the gear ring and the parts rotatable therewith; and
(b) said cutter assembly is disposed within the outer circumferential surface of said support ring to protect said cutter assembly and prevent inadvertent actuation thereof as it rotates relative to said support ring.

7. The structure set forth in claim 1, including:
(a) a stabilizing ring formed in at least two arcuate sections corresponding in position to said arcuate sections of said support ring;
(b) said stabilizing ring being disposed longitudinally from said support ring, with said gear ring and cutter assembly between said stabilizing ring and said support ring;
(c) tie bolts disposed at a greater radius from the center of the pipe than the gear teeth of said gear ring;
(d) said tie bolts extending from said support ring to said stabilizing ring and connecting same together to thereby secure said stabilizing ring to the pipe so that it remains stationary whereby both sides of the pipe on each side of the cut made by the cutter assembly are held in axial alignment during the cutting of the pipe to assure an accurate cut and beveling; and
(e) a releasable clamp secured to said stabilizing ring for holding the arcuate sections thereof securely clamped to the pipe during the cutting action but releasable to open same for removal from the side of the pipe in a lateral direction.

References Cited

UNITED STATES PATENTS

| | | | |
|---|---|---|---|
| 2,747,274 | 5/1956 | Willard et al. | 30—97 |
| 2,769,234 | 11/1956 | Young | 30—97 |
| 3,253,336 | 5/1966 | Brown | 30—98 |

MYRON C. KRUSE, *Primary Examiner.*

U.S. Cl. X.R.

30—98